(12) United States Patent  
Comeaux et al.

(10) Patent No.: US 7,927,684 B2  
(45) Date of Patent: Apr. 19, 2011

(54) LOW COEFFICIENT OF FRICTION POLYMER FILM

(75) Inventors: Christopher M. Comeaux, Worcester, MA (US); Frank M. Keese, Cambridge, NY (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 247 days.

(21) Appl. No.: 11/126,072

(22) Filed: May 10, 2005

(65) Prior Publication Data

US 2005/0282023 A1    Dec. 22, 2005

Related U.S. Application Data

(63) Continuation-in-part of application No. 10/780,467, filed on Feb. 17, 2004, now Pat. No. 7,238,102, which is a continuation-in-part of application No. 09/765,695, filed on Jan. 18, 2001, now Pat. No. 6,930,063.

(60) Provisional application No. 60/448,321, filed on Feb. 18, 2003, provisional application No. 60/176,779, filed on Jan. 19, 2000.

(51) Int. Cl.  
*B32B 27/12* (2006.01)

(52) U.S. Cl. ............ 428/137; 442/66; 442/67; 442/68; 442/97; 442/98; 442/99; 428/336; 428/909

(58) Field of Classification Search ............ 442/66–68, 442/97–99; 428/909, 137, 336  
See application file for complete search history.

(56) References Cited

U.S. PATENT DOCUMENTS

| | | |
|---|---|---|
| 2,852,811 A | 9/1958 | Petriello |
| 2,906,658 A | 9/1959 | Doban |
| 2,977,336 A | 3/1961 | Blatz |
| 3,521,653 A | 7/1970 | Zoya et al. |
| 3,630,802 A | 12/1971 | Dettling |
| 3,650,880 A | 3/1972 | Tieniber |
| 3,788,106 A | 1/1974 | True |
| 3,870,593 A | 3/1975 | Elton et al. |
| 3,941,741 A | 3/1976 | De Zuba et al. |
| 3,990,932 A | 11/1976 | Dupire |

(Continued)

FOREIGN PATENT DOCUMENTS

DE    203 11 441 U1    10/2003

(Continued)

OTHER PUBLICATIONS

Silicones, Encylopedia of Polymer Science and Technology, 2003, pp. 1-56.*

(Continued)

*Primary Examiner* — Elizabeth M Cole  
(74) *Attorney, Agent, or Firm* — Larson Newman & Abel, LLP; Chi Suk Kim

(57) ABSTRACT

A HVAC system of a motor vehicle includes a film having openings defined therein and moveable between open and closed positions. The film regulates airflow by opening and closing apertures defined in a housing of the HVAC system. The film is disposed in a film valve assembly containing first and second rollers that wind and unwind the film. The film includes a substrate that includes a fiber selected from the group of polyester-based fibers, glass-based fibers, and combinations thereof. An elastomeric layer is disposed on the substrate layer. The substrate also includes a silicone layer disposed on the elastomeric layer for minimizing noise created as the film moves between the open and closed positions.

22 Claims, 6 Drawing Sheets

U.S. PATENT DOCUMENTS

| | | | |
|---|---|---|---|
| 3,991,257 A | 11/1976 | Mayer et al. | |
| 4,075,065 A | 2/1978 | Korbelak et al. | |
| 4,123,313 A | 10/1978 | Queen et al. | |
| 4,139,591 A | 2/1979 | Jurisich | |
| 4,233,358 A | 11/1980 | Jones et al. | |
| 4,248,652 A | 2/1981 | Civardi et al. | |
| 4,275,104 A | 6/1981 | de Nagybaczon | |
| 4,526,830 A | 7/1985 | Ferziger et al. | |
| 4,531,671 A | 7/1985 | Schwenk | |
| 4,543,145 A | 9/1985 | Schnell et al. | |
| 4,555,543 A | 11/1985 | Effenberger et al. | |
| 4,635,788 A | 1/1987 | McDonald | |
| 4,698,110 A | 10/1987 | Vassiliou | |
| 4,702,956 A | 10/1987 | Wilson et al. | |
| 4,715,912 A | 12/1987 | Tillotson | |
| 4,725,279 A | 2/1988 | Woodroof | |
| 4,770,927 A | 9/1988 | Effenberger et al. | |
| 4,773,310 A | 9/1988 | Corwin | |
| 4,816,330 A | 3/1989 | Freund et al. | |
| 4,883,716 A | 11/1989 | Effenberger et al. | |
| 4,943,473 A | 7/1990 | Sahatjian et al. | |
| 5,021,109 A | 6/1991 | Petropoulos et al. | |
| 5,066,537 A * | 11/1991 | O'Rell et al. | 442/189 |
| 5,075,065 A | 12/1991 | Effenberger et al. | |
| 5,105,730 A | 4/1992 | Smith | |
| 5,118,372 A | 6/1992 | Spahn | |
| 5,192,609 A | 3/1993 | Carroll, Jr. | |
| 5,217,797 A | 6/1993 | Knox et al. | |
| 5,230,937 A | 7/1993 | Effenberger et al. | |
| 5,254,657 A * | 10/1993 | Inoue | 528/17 |
| 5,326,315 A | 7/1994 | Inoue et al. | |
| 5,328,510 A | 7/1994 | Hofmann et al. | |
| 5,439,631 A | 8/1995 | Schneider et al. | |
| 5,472,541 A | 12/1995 | Simmons et al. | |
| 5,490,893 A | 2/1996 | Enlow et al. | |
| 5,653,630 A | 8/1997 | Higashihara | |
| 5,720,657 A | 2/1998 | Kamiya et al. | |
| 5,759,924 A | 6/1998 | Sahlin | |
| 5,885,152 A | 3/1999 | Wardlaw | |
| 5,893,957 A | 4/1999 | Suzuki | |
| 5,901,943 A | 5/1999 | Tsunoda | |
| 5,964,658 A | 10/1999 | Aizawa | |
| 6,001,207 A | 12/1999 | Enlow et al. | |
| 6,045,444 A | 4/2000 | Zima et al. | |
| 6,060,135 A | 5/2000 | Service | |
| 6,074,294 A | 6/2000 | Stevenson | |
| 6,086,699 A | 7/2000 | Nakashima et al. | |
| 6,087,016 A * | 7/2000 | Feeney et al. | 428/454 |
| 6,211,630 B1 | 4/2001 | Enzinna | |
| 6,261,172 B1 | 7/2001 | Shibata | |
| 6,273,811 B1 | 8/2001 | Pawlak, III | |
| 6,293,339 B1 | 9/2001 | Uemura et al. | |
| 6,296,562 B1 | 10/2001 | Uemura et al. | |
| 6,308,770 B1 | 10/2001 | Shikata et al. | |
| 6,348,117 B1 | 2/2002 | Tribo et al. | |
| 6,352,150 B1 | 3/2002 | Lewis | |
| 6,368,207 B1 | 4/2002 | McLaughlin et al. | |
| 6,376,033 B1 | 4/2002 | Sonobe et al. | |
| 6,378,222 B1 | 4/2002 | Enzinna | |
| 6,383,325 B1 | 5/2002 | Tsai | |
| 6,390,217 B1 | 5/2002 | O'Brien et al. | |
| 6,449,981 B1 | 9/2002 | Ueda et al. | |
| 6,481,995 B2 | 11/2002 | Delrosario et al. | |
| 6,482,884 B1 | 11/2002 | Schaal et al. | |
| 6,508,703 B1 | 1/2003 | Uemura et al. | |
| 6,520,849 B1 | 2/2003 | Greenwald et al. | |
| 6,569,009 B2 | 5/2003 | Nishikawa et al. | |
| 6,588,495 B2 | 7/2003 | Ito et al. | |
| 6,612,922 B2 | 9/2003 | Uemura et al. | |
| 6,616,060 B2 | 9/2003 | Parisi et al. | |
| 6,669,549 B2 | 12/2003 | Uemura et al. | |
| 6,688,964 B2 | 2/2004 | Uemura et al. | |
| 6,905,985 B1 | 6/2005 | Schindzielorz et al. | |
| 6,926,068 B2 | 8/2005 | Ito et al. | |
| 6,926,253 B2 | 8/2005 | Tokunaga et al. | |
| 6,930,063 B2 | 8/2005 | Keese | |
| 6,932,692 B1 | 8/2005 | Lin | |
| 2001/0034170 A1 | 10/2001 | Keese | |
| 2004/0159420 A1 | 8/2004 | Goupil, Jr. et al. | |
| 2004/0229043 A1 | 11/2004 | Spohn et al. | |

FOREIGN PATENT DOCUMENTS

| | | |
|---|---|---|
| DE | 203 18 715 U1 | 4/2004 |
| DE | 203 19 166 U1 | 4/2004 |
| EP | 0 125 955 B1 | 11/1984 |
| EP | 0 705 725 B1 | 4/1996 |
| WO | WO9707433 * | 2/1997 |
| WO | WO 01/53073 A1 | 7/2001 |
| WO | WO 01/70529 A1 | 9/2001 |
| WO | WO 2004/074020 A2 | 9/2004 |

OTHER PUBLICATIONS

TPE Tips Issue 6, GLS Corporation, Jun. 28, 2002, pp. 1-2.*
Author: Mann Industries, Entitled "Mann Tech", Copyright 1998.
Author: Nonoyama et al., Entitled: "Development of a Film Door Type Air Conditioning Unit", pp. 29-35, Copyright 1996.

* cited by examiner

LOW COEFFICIENT OF FRICTION POLYMER FILM

CROSS-REFERENCE TO RELATED APPLICATION(S)

This application is a continuation-in-part application of U.S. application Ser. No. 10/780,467, filed Feb. 17, 2004, entitled "HEATING, VENTILATION, AND AIR CONDITIONING SYSTEM HAVING A FILM VALVE AND FILM FOR CONTROLLING AIR FLOW," and naming Gerald M. Goupil Jr., Christopher M. Comeaux, and Frank M. Keese as inventors, which claims priority to the U.S. Provisional Application No. 60/448,321, filed Feb. 18, 2003, each of which is included in its entirety.

This application is a continuation-in-part application of U.S. application Ser. No. 09/765,695, filed Jan. 18, 2001, entitled "NON-CURLING REINFORCED COMPOSITE MEMBRANES WITH DIFFERING OPPOSED FACES, METHODS FOR PRODUCING AND THEIR USE IN VARIED APPLICATIONS," and naming Frank M. Keese as inventor, which claims priority to the U.S. Provisional Application No. 60/176,779, filed Jan. 19, 2000, each of which is included in its entirety.

FIELD OF THE DISCLOSURE

This disclosure, in general, relates to polymeric films.

BACKGROUND

Control surfaces are known in the art. To date, rigid doors have been used as control surfaces to control air flow within a housing of a heating, ventilation, and air conditioning unit (HVAC). Recently, composite structures have been designed to replace these conventional rigid doors. Specifically, the composite structures have been designed as flexible films. The film controls airflow by opening and closing apertures in inlets and outlets of the housing of the HVAC system. Generally, the film is disposed in a film valve assembly that includes a frame having rollers. To control air flow, an actuator moves a first roller to wind and unwind the film. As the film is wound and unwound, the openings in the film align with the apertures in the housing, thus allowing air to flow through the housing.

Prior art control surfaces, such as rigid doors, are well known to those skilled in the art and include substrates including filled polypropylene or nylon plastic covered by a semi-open or open cell foam, or an overmolded rubber. The disadvantages of using these control surfaces include a need for additional packaging volume within the HVAC system and the separation of hot and cold air streams resulting in decreased air mixing efficiency.

Additionally, prior art control surfaces such as films are also well known to those skilled in the art and include both elastomeric and non-elastomeric layers disposed on substrates including fabrics and polymers. Yet, in every case, the prior art films do not sufficiently perform when tested in the housing of the HVAC system. Common disadvantages of prior art films include accumulation of static charge, high coefficients of friction, film blocking, film creep, high bending resistance, lack of noise reduction, and tacky surfaces.

Specifically, accumulation of static charge causes airborne debris to attach to surfaces of the film resulting in noise production as the film is moved within the housing of the HVAC system. High coefficients of friction require the film valve assembly to be equipped with larger actuators to overcome the possibility that the film will stick, slip, or get stuck in one position. Film blocking results in noise production as the film is separated from itself as the film is unwound from the rollers. Film creep results in stretching that leads to the misalignment of the film within the housing of the HVAC system. High bending resistance requires the film valve assembly to be equipped with larger actuators to overcome the possibility that the film will not efficiently wind onto the rollers. A lack of noise reduction is caused by the excessive vibration of the film when disposed in the film valve assembly, resulting in unacceptable noise levels within the housing of the HVAC system. Finally, tacky surfaces result in the generation of peeling noises as the film breaks contact with the rollers.

Theoretically, many different composite structures could be used as films in the housing of the HVAC system. One such composite structure is disclosed in U.S. Pat. No. 5,217,797 to Knox, et al. This patent discloses a composite structure that includes a substrate including perfluoropolymer fibers sandwiched between a perfluoropolymer layer and an elastomeric layer. Further, the substrate can be reinforced by glass, quartz, aramid, or nylon fiber. Yet, this patent does not disclose a silicone topcoat layer disposed on an elastomeric layer.

Yet, the composite structure disclosed in U.S. Pat. No. 5,217,797 is not the sole prior art. Other attempts have been made to produce films or composite structures that overcome all of the aforementioned disadvantages. Such attempts include a composite structure for use in the housing of the HVAC system described in European Patent 0 705 725 A1 to Higashihara of Denso, formerly Nippondenso Co. Ltd. of Aichi-ken, Japan. This patent discloses a composite structure including seven layers. More specifically, the patent discloses a composite structure including a polyphenylene sulfide layer and an adhesive epoxy layer disposed on both sides of the polyphenylene sulfide layer. The polyphenylene sulfide layer and the adhesive epoxy layer are sandwiched between two nylon layers. The two nylon layers are further sandwiched between two layers of silicone.

The composite structure described in European Patent 0 705 725 A1 is further described in a 1996 SAE article 960687 entitled "Development of a Film Door Type Air Conditioning Unit." This article discloses the inability of a silicone film alone to adequately reduce noise in the housing of the HVAC system.

Additionally, a composite structure of a very similar but slightly different design to the European Patent 0 705 725 A1 by Denso was also tested. The composite structure is used by Lexus, a division of The Toyota Motor Company of Toyota City, Japan, as a film in the housing of the HVAC system designed by Denso for the 1995 Lexus LS400. This composite structure includes a polyphenylene sulfide layer and a binder layer including alumina trihydrate disposed on both faces of the polyphenylene sulfide layer. The polyphenylene sulfide layer and the alumina trihydrate binder layers are sandwiched between two nylon layers. The two nylon layers are further sandwiched between two layers of silicone.

Several of the Lexus HVAC systems and the corresponding composite structures were removed from used automobiles and analyzed. The analyses showed that the aforementioned composite structures yielded unsatisfactory results due to excessive nylon fraying. It is known to those skilled in the art that non-coated fibers will fray. In the tested HVAC systems and the corresponding composite structures, the excessive nylon fraying resulted from an incomplete sandwiching of the two nylon layers with the two layers of silicone. Specifically, the incomplete sandwiching resulted from the two layers of silicone disposed only on a top edge of the two nylon layers, as opposed to being fully disposed entirely over the two nylon layers. The incomplete sandwiching caused the nylon layers to wear. The frayed nylon became intertwined with the rollers of the film valve assemblies, thus reducing the ability of the composite structures to freely move and rendering the composite structures unusable.

Additionally, the analyses showed that the aforementioned composite structures yielded unsatisfactory results due to excessive nylon freezing. Specifically, if the evaporator core produces condensation, the nylon-fibers will absorb the condensation. Once the nylon-fibers absorb the condensation, the nylon-fibers will freeze in low temperatures, and increase in stiffness. The increase in stiffness will render the nylon-fiber unusable.

Additionally, component level debris intrusion testing of the composite structures showed that airborne debris was embedded in surfaces of the composite structures. The airborne debris resulted in the generation of noise as the composite structures were moved in the housing of the HVAC systems.

In another attempt to develop a composite structure that overcomes the aforementioned disadvantages of prior art control surfaces, Nippondenso Co. Ltd. of Aichi-ken, Japan developed a film disclosed in U.S. Pat. No. 5,326,315. This patent discloses a film that includes at least two kinds of layers having different characteristics, for example, a film layer provided on at least one side of a cloth layer, or a resin material disposed on one side of the cloth layer. That is, two different kinds of layers are provided such as a film layer and a fabric layer, or a resin layer and a fabric layer.

Specifically, the film includes six embodiments. In a first embodiment, the film includes a resin film layer, a cloth layer disposed on the resin film layer, and a resin coat layer disposed on the cloth layer. In a second embodiment, the film includes the resin film layer and the cloth layer. The cloth layer is disposed on the resin film layer with an adhesive. In a third embodiment, the film includes the resin film layer and the cloth layer. The cloth layer is disposed on the resin film layer with the adhesive, and the resin coat layer is impregnated in the cloth layer. In a fourth embodiment the film includes the cloth layer and the resin film layer. The resin film layer is disposed on the cloth layer with the adhesive. In a fifth embodiment, the film includes the cloth layer and the resin coat layer. The resin coat layer is impregnated in the cloth layer. In the sixth embodiment, the film includes the cloth layers disposed on the resin film layer with the adhesive. Additionally, in the sixth embodiment, the resin film layer is disposed on the cloth layer with the adhesive.

The resin film layer includes PPS (polyphenylene sulfide), PET (polyethylene terephthalate), PEN (polyethylene naphthalate), PEI (polyether imide), PI (polyimide), PES (polyether sulfone), PEEK (polyether etherketone), PSF (polysulfone), PC (polycarbonate), PVC (polyvinyl chloride), and PS (polysulfone).

The cloth layer can include filaments of nylon fibers, PET fibers, PPS fibers, aramid fibers, p-aramid fibers, novoloid fibers, polytetrafluoroethylene fibers, glass fibers, carbon fibers, and boron fibers. Also, the resin coat layer includes silicon resin, acrylic resin, or fluorocarbon resin.

The film disclosed in this patent does not include a silicone topcoat layer disposed over an elastomeric layer. Therefore, if this film is used as the film in the housing of an HVAC system, the absence of the elastomeric layer allows for excess vibration leading to excessive noise generation, and thus not improving on the aforementioned disadvantages.

In another attempt to develop a composite structure that overcomes the aforementioned disadvantages of prior art control surfaces, Milliken & Company of Spartanburg, S.C. developed a film disclosed in International Patent WO 01/70529 A1. This patent discloses a film including a synthetic, continuous, multi filament, non-textured yarn layer with improved dimensional stability & creep resistance. Further, the patent discloses the yarn's floats reducing the coefficient of friction of the film and the noise generated when the film moves in the housing of the HVAC system. Still further, the application discloses the use of a polyurethane and/or polyacrylate layer disposed on the yarn layer that reduces fray resistance as the film moves in the housing of the HVAC system. Yet, this patent does not disclose a silicone topcoat layer disposed on an elastomeric layer.

When tested, the Milliken film yields unsatisfactory results. Specifically, airborne debris becomes imbedded in the film thus generating noise as the film moves in the housing of the HVAC system. Additionally, after the film was exposed to heat, the edges curled and frayed therefore rendering the film unusable.

In yet another attempt to overcome the aforementioned disadvantages of prior art control surfaces, composite structures designed for use in non-automotive industries were also researched and tested as films in the housing of the HVAC system. Examples of such composite structures include a helium barrier developed by Mann Industries, a division of Takata Global Group of Tokyo, Japan, and two coated woven surfaces disclosed in the U.S. Pat. No. 5,230,937 to Effenberger and in U.S. patent application No. 2001/0034170 to Keese.

The helium barrier developed by Mann Industries includes a 70 denier polyester plain weave fabric sandwiched between two polyurethane primer layers. Further, a polyurethane film layer is disposed on a first face of one of the polyurethane primer layers. Specifically, the helium barrier does not include a silicone topcoat layer disposed on an elastomeric layer.

When tested, the 70 denier fabric did not have sufficient structural rigidity to keep the helium barrier from curling after exposure to high temperatures. In an attempt to overcome the curling of the composite structure, 75 and 150 denier polyester fabrics were substituted in the aforementioned helium barrier and evaluated. When exposed to high temperatures, the 75-denier fabric also exhibited a tendency to curl. Conversely, the 150-denier fabric, when exposed to high temperatures, did not curl.

Additionally, testing also showed that when the helium barrier was placed in the housing of the HVAC system airborne debris became imbedded in the polyurethane primer layer. As the helium barrier was moved within the housing of the HVAC system, the imbedded airborne debris generated unacceptable noise. Yet, the airborne debris did not imbed in the polyurethane film layer.

In an attempt to remedy the noise generation, the polyurethane film layer was disposed on a face of both polyurethane primer layers in the aforementioned helium barrier. Although this construction of the helium barrier minimized noise generation, the helium barrier was found to adhere to itself. Additionally, the helium barrier was found to exhibit a high coefficient of friction when moved within the housing of the HVAC system. Further, diatomaceous earth was added to the film in an attempt to reduce the film's tendency to adhere to itself. Yet, this had no positive effect.

As an alternative to the helium barrier developed by Mann Industries, the Effenberger patent discloses a composite structure including a substrate that is unlike the helium barrier. The substrate is preferably a textile substrate, coated on one or both faces with a matrix. The matrix includes an initial perfluoropolymer layer and a fluoroelastomer overcoat layer. In some embodiments, a methylphenyl silicone oil is also added to the matrix. More specifically, the Effenberger patent does not disclose a composite structure that includes a silicone topcoat disposed on an elastomeric layer.

In a first embodiment of the Effenberger patent, a perfluorinated polymer is disposed, as an initial layer, on one or both faces of the substrate. Additionally, a fluoroelastomer layer is disposed, as an overcoat layer, on the initial perfluoropolymer layer.

In a second embodiment of the Effenberger patent, the methylphenyl silicone oil is applied simultaneously with the perfluoropolymer thus forming a mixed perfluoropolymer layer disposed on the substrate. In a third embodiment of the Effenberger patent, the methylphenyl silicone oil is applied to the substrate first, followed by an application of the perfluoropolymer, thus resulting in a methylphenyl silicone oil layer sandwiched between the perfluoropolymer layer and the substrate. Additionally, in all of the aforementioned embodiments, multiple fluoroelastomer layers may be added as topcoat layers, if so desired.

Specifically, the substrate of the Effenberger patent may include glass, fiberglass, ceramics, graphite, polybenzimidazole, polyaramides, polytetrafluoroethylene, metal, polyolefins, polyesters, polyamides, copolymers of tetrafluoroethylene, polyether sulfones, polyimides, polyether ketones, polyetherimides, novoloid phenolic fibers or natural textiles. The initial perfluoropolymer layer and the overcoat fluoroelastomer layer include polytetrafluoroethylene, ethylene-propylene copolymers, or copolymers of tetrafluoroethylene and perfluoro-propyl vinyl ether.

The Keese application discloses a substrate that is also unlike the helium barrier developed by Mann Industries. The Keese application discloses a substrate and a perfluoropolymer layer disposed on a first and second face of the substrate. Additionally, a colloidal silica dispersion and a perfluorinated copolymer resin dispersion are disposed on the second face of the substrate to render the surface bondable. Finally, an elastomeric layer is disposed on the colloidal silica dispersion and the perfluorinated copolymer resin dispersion.

More specifically, the substrate is reinforced with glass or fiberglass. Additionally, the perfluoropolymer layer includes polytetrafluoroethylene or other similar compounds. Further, the elastomeric layer includes a silicone rubber. Still further, the perfluorinated copolymer resin dispersion includes fluorinated ethylene propylene or perfluoroalkoxy-modified tetrafluoroethylene. Specifically, the colloidal silica dispersion disposed on the second face of the substrate is not elastomeric. The colloidal silica dispersion is defined as spheres of silica dispersed in an alkaline medium that produce a negative charge. Finally, the Keese application does not disclose a silicone topcoat layer disposed on the top of the elastomeric layer.

When tested, both the Effenberger and Keese composite structures also yielded unsatisfactory results. Specifically, the perfluoropolymer layer and the elastomeric layer of the composite structures accumulated static charge thus allowing airborne debris to become lodged on the surfaces of the perfluoropolymer layer and the elastomeric layer. This resulted in unacceptable noise as the composite structures were moved between open and closed positions within the housing of the HVAC system.

Further, the elastomeric layer of the composite structure of Keese yielded a tacky surface with a high coefficient of friction. The high coefficient of friction prevented the composite structure from being moved between open and closed positions within the housing of the HVAC system when the elastomeric layer was in contact with the housing of the HVAC system. Additionally, the tacky surface contributed to airborne debris becoming lodged on the tacky surface resulting in unacceptable noise as the composite structures were moved between open and closed positions within the housing of the HVAC system. Still further, as the surface made and broke contact with the rollers, unacceptable noise was generated.

Although the prior art composite structures are currently used in various applications, there remains an opportunity for the development of a composite surface that exhibits superior longevity and physical properties to be used as a film in HVAC systems of motor vehicles.

SUMMARY

In a particular embodiment, the disclosure is directed to a multilayer film including a substrate having first and second major surfaces, a first polymer layer overlying the first major surface of the substrate and comprising elastomer, and a second polymer layer overlying the first polymer layer and comprising silicone.

In another embodiment, the disclosure is directed to a multilayer film including a substrate including first and second major surfaces, a first polymer layer overlying the first major surface and comprising fluoropolymer, a second polymer layer overlying the first polymer layer and comprising elastomer, and a third polymer layer overlying the second polymer layer and comprising silicone.

In a further embodiment, the disclosure is directed to a multilayer film including a fiberglass substrate having first and second major surfaces, a first fluoropolymer layer overlying the first major surface, a second fluoropolymer layer overlying the second major surface, and an elastomer layer overlying the second fluoropolymer layer. The elastomer layer includes an elastomer selected from a group consisting of urethane and silicone rubber. The multilayer film further includes a silicone topcoat layer overlying the elastomer layer. The silicone topcoat layer includes vinyl and methoxy function dimethyl siloxane.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE PREFERRED EMBODIMENT(S)

Figure 2:
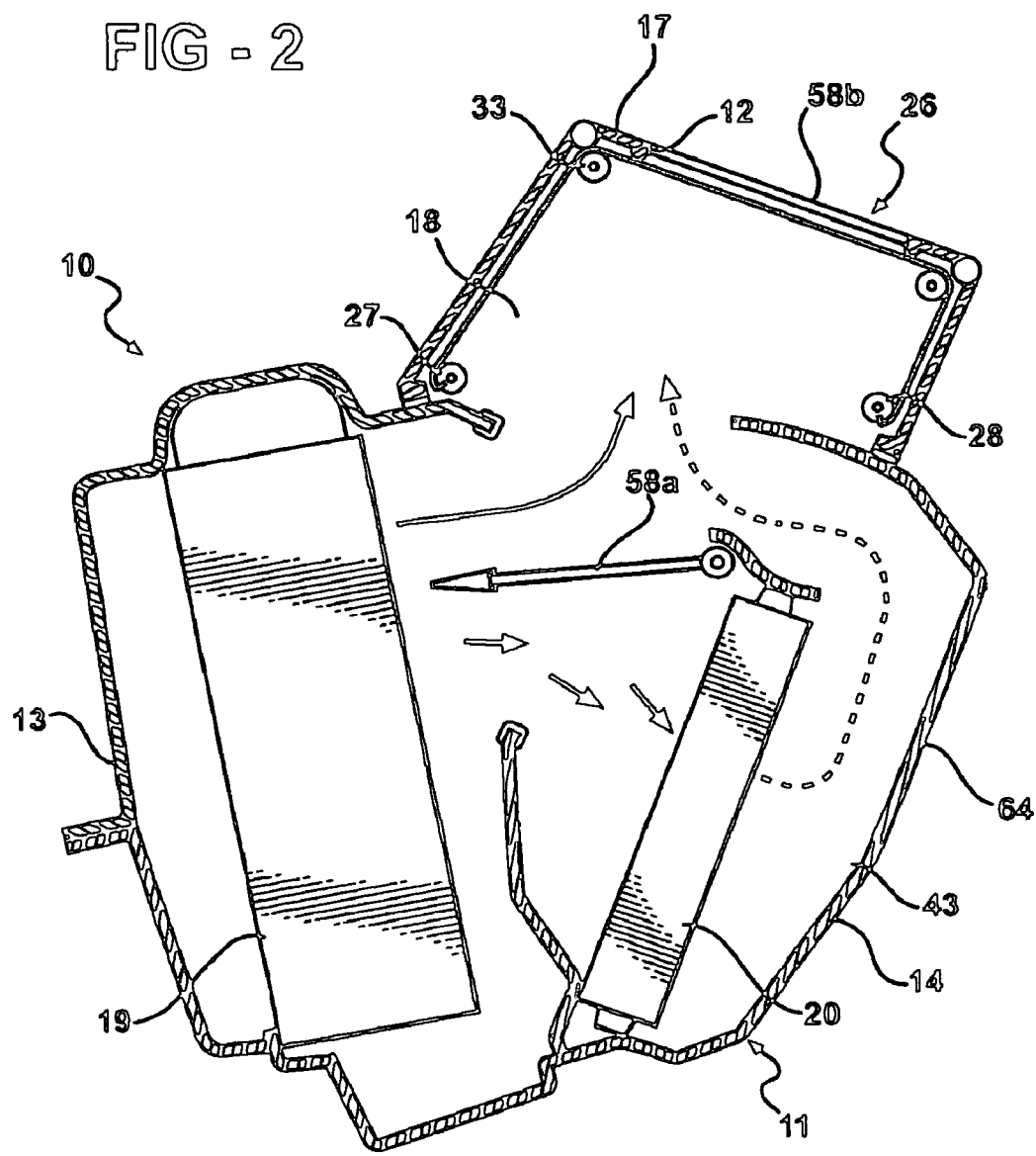
FIG. 2 is a cross-sectional view of an HVAC system including a cross-sectional view of the film valve assembly.
Figure 3:
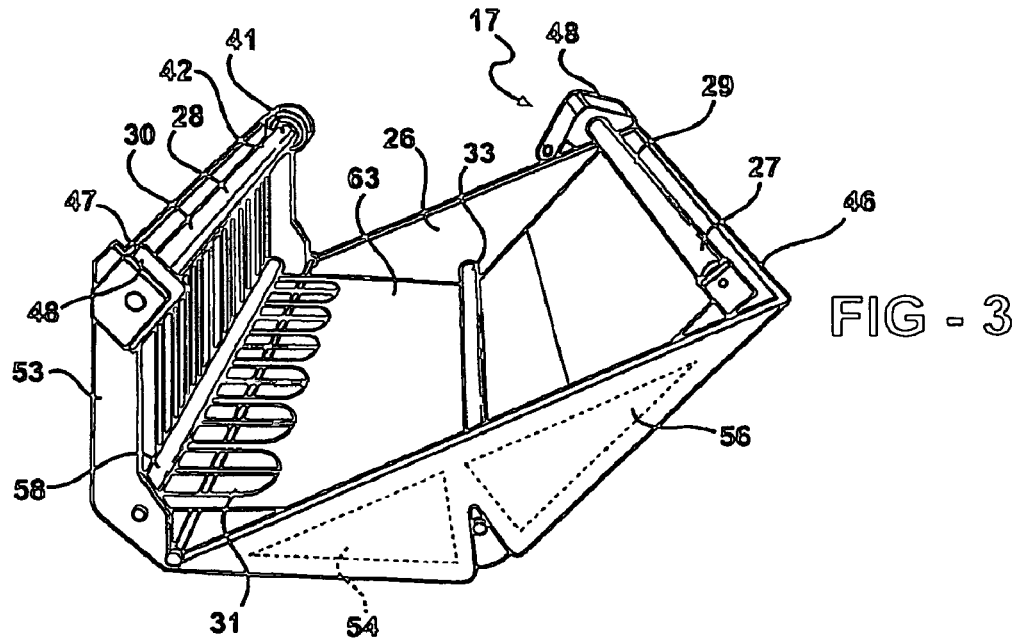
FIG. 3 is a perspective view of a film in a film valve assembly in a first position.
Figure 4:
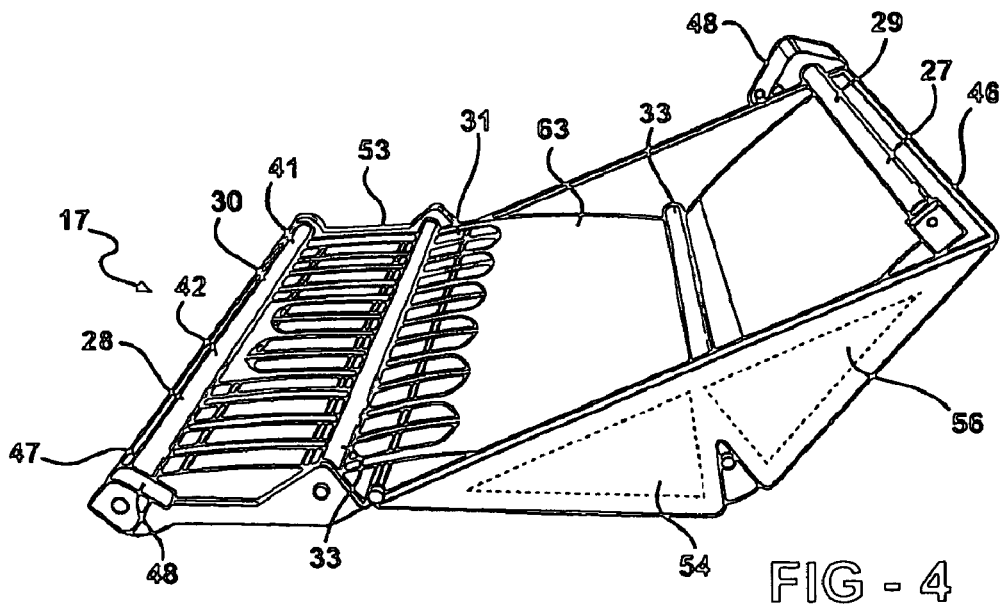
FIG. 4 is a perspective view of the film valve assembly of FIG. 3 in a second position.

Referring to the Figures, wherein like numerals indicate like parts throughout several views, a heating, ventilation, and air conditioning system (HVAC) is shown generally at 10. The HVAC system 10 generally defines a housing 11 that defines an air inlet 15 and an air outlet 66. The housing 11 includes a film valve assembly 17 that defines at least one aperture 12, as shown in FIG. 2. Also shown in FIG. 2, the housing 11 defines a mixing chamber 18 therein. Further, the HVAC system 10 includes an evaporator assembly 13 coupled to the housing 11. The HVAC system 10 also includes a heater assembly 14 coupled to the evaporator assembly 13 and the housing 11. The HVAC system 10 further includes control surfaces 58a, 58b disposed in the housing 11 that are moveable for controlling air flow. Additionally, the HVAC system 10 includes a fan assembly 16 disposed on the air inlet 15.

The evaporator assembly 13 and heater assembly 14 respectively include an evaporator core 19 and a heater core 20 enclosed within the housing 11. Additionally, the air inlet 15 defines a passageway 21 having a cavity 22 at an end 23 thereof. The air inlet 15 further includes the fan assembly 16 having a fan 24 disposed in a fan housing 25.

The evaporator core 19 is operatively controlled with the HVAC system 10, and the heater core 20 regulates air temperature. The evaporator core 19 extends across an entire width of the housing 11 such that all air passes therethrough. The heater core 20, conversely, extends along an edge 43 of the housing 11.

Referring to FIG. 2, the control surface 58a is shown as a door. The control surface 58a may direct the air to flow around the heater core 20. Air directed by the control surface 58a around the heater core 20 flows up a back face of the heater core 20 and into the air mixing chamber 18. Within the air mixing chamber 18, un-heated air that passed solely through the evaporator core 19 is mixed with the air directed around the heater core 20 to achieve a desired temperature. The air then flows out of the mixing chamber 18 to the air outlet 66, as selected by an operator.

The control surface 58b can be further defined as a film 63 housed within the film valve assembly 17. The film 63 is suspended across at least one aperture 12 thus covering the air-mixing chamber 18. The film 63 can be moved across at least one aperture 12 with rollers, pulleys, cords, or gears, and the like.

Referring to FIGS. 1 through 5, the film 63 defines openings 31. The openings 31 align with the air outlet 66 such that air can flow out through the air outlet 66. More specifically, the openings 31 in the film 63 actually align with the at least one aperture 12 that is defined by the film valve assembly 17, which, as introduced above, is a component of the air outlet 66. For example, when the openings 31 defined by the film 63 are at least partially aligned with at least one aperture 12, air can pass from the mixing chamber 18 through the film 63 and through the at least one aperture 12.

Figure 8:
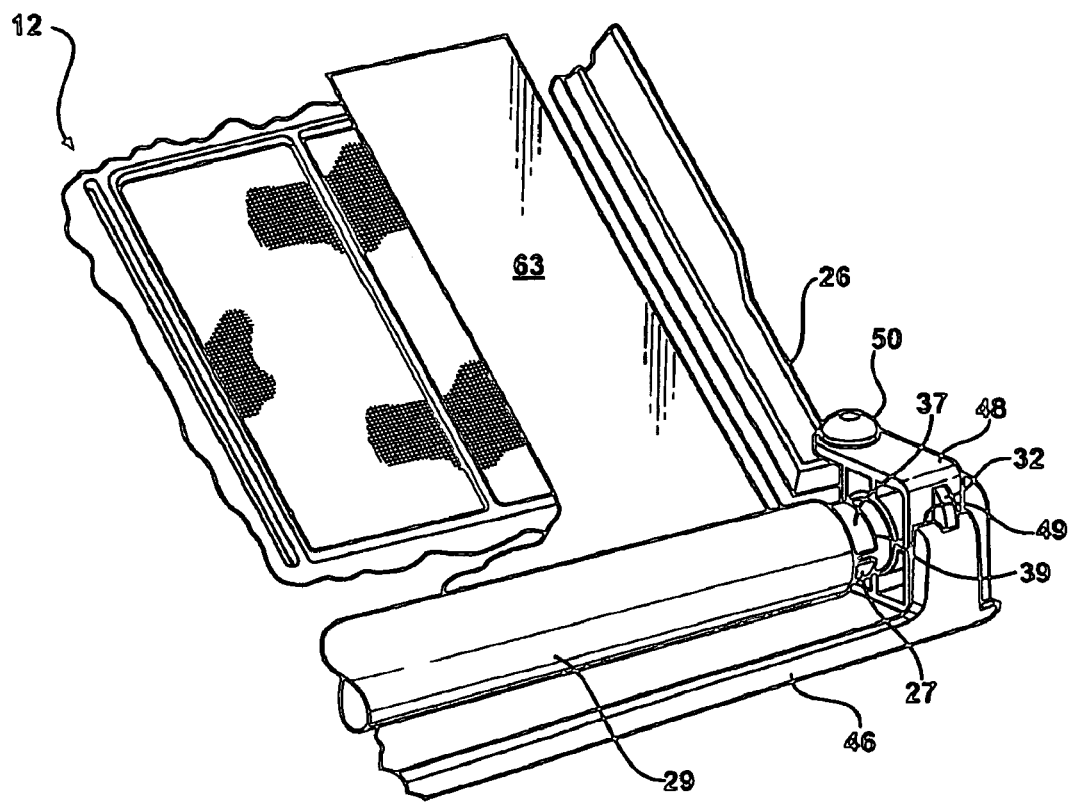
FIG. 8 is a fragmented perspective view of the film and the roller installed in the film valve assembly.

Referring to FIGS. 3 through 5 and 8, the film valve assembly 17 is shown in greater detail. The film valve assembly 17 generally includes a frame 26. The frame 26 includes first 53, second 54, and third 56 segments. Referring specifically to FIG. 8, the frame 26 also includes a slot 49 which receives a cap 48 disposed on the frame 26. The cap 48 includes an alignment rib 32 that snaps into the slot 49. The frame 26 may include additional slots 49 and the cap 48 may include additional alignment ribs 32 matching the number of slots 49. Moreover, the cap 48 may include a fastener 50 for further securing the cap 48 to the frame 26.

Referring to FIGS. 3-6 and 8, the frame 26 also includes first and second rollers 27, 28. The film 63 has a first end 29 disposed on the first roller 27 and a second end 30 disposed on the second roller 28 with the film 63 extending therebetween. With specific reference to FIG. 8, the first and second rollers 27, 28 are disposed on opposite ends 46, 47 of the frame 26 with the first and second ends 29, 30 of the film 63 coupled thereto. In addition, the film 63 may be supported and kept under tension by one or more idle rollers 33 rotatably supported on the frame 26.

The first roller 27 also includes a first biasing device 40. The first biasing device 40 continually urges the first roller 27 to rotate in a first direction under a first constantly applied force. Additionally, the second roller 28 includes a second biasing device 41. The second biasing device 41 continually urges the second roller 28 to rotate in a second direction under a second constantly applied force. The first 40 and second 41 biasing devices may be torsion springs, helical torsion springs or any other suitable members that provide torsional force.

Figure 5:
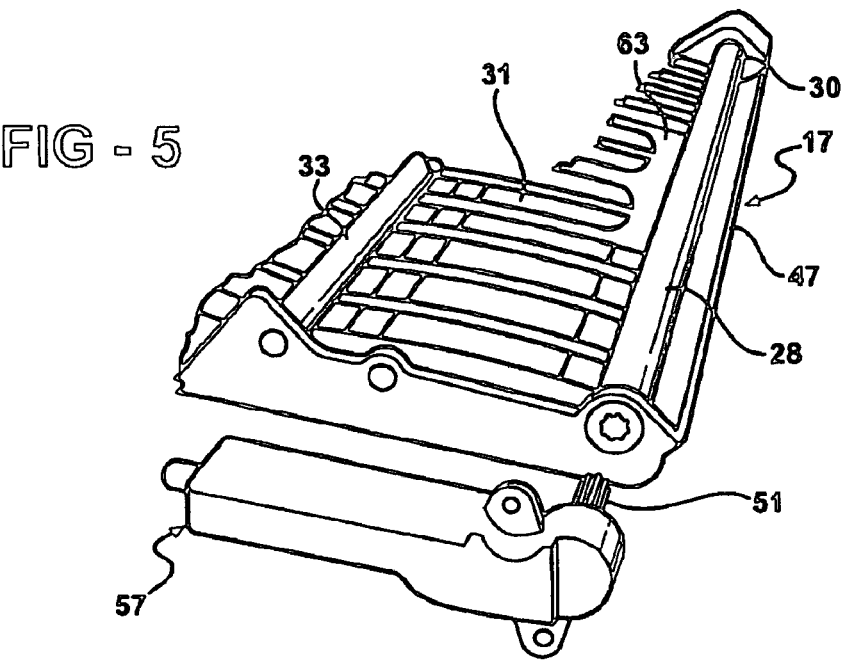
FIG. 5 is a fragmented perspective view of the film valve assembly having an actuator disposed in a spaced relationship.

Referring specifically to FIG. 5, an actuator 57 is coupled to the second roller 28 thereby providing a non-constant rotational torque. The actuator 57 may be a stepper motor, a direct current motor and gears, or any suitable actuator. The actuator 57 includes a rotatable connector 51 that interfaces the actuator 57 with the second roller 28 in female/male engagement. The actuator 57 transfers a positive rotational torque to the second roller 28. Alternatively, a second actuator 57 may be coupled to the first roller 27.

Figure 6:
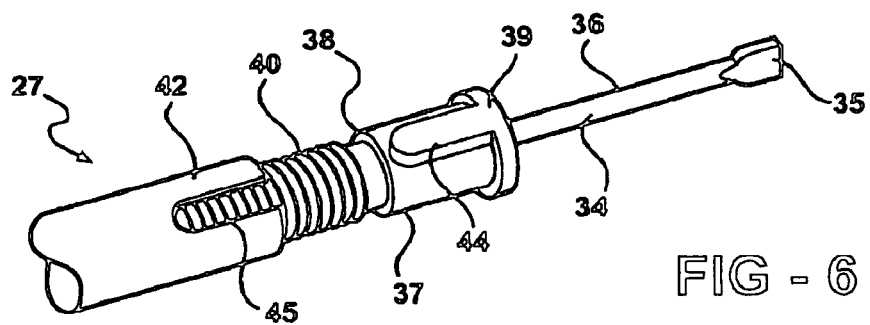
FIG. 6 is a fragmented perspective view of a roller.
Figure 7:
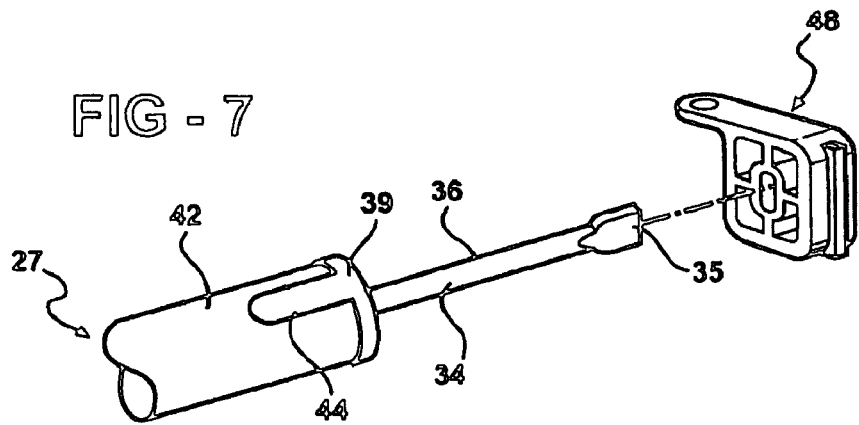
FIG. 7 is a fragmented perspective view of the roller and a cap.

Referring to FIGS. 6 and 7, the first roller 27 is made from metal, plastic, or any other suitable material. The first roller 27 includes a cylinder 37 that is also made from metal, plastic, or any other suitable material. The cylinder 37 includes a hollow end 38 that accepts the first biasing device 40. The cylinder 37 also includes a beveled end 39 that accepts an axle 34. The axle 34 includes a flattened distal end 35. The flattened distal end 35 interfaces with the frame 26 to ensure that the axle 34 does not rotate. The cylinder 37 also includes a second end 36 extending from the hollow end 38. Finally, the cylinder 37 includes a locking rib 44.

The first roller 27 further includes a shaft 42 that is made from metal, plastic, or any other suitable material. The shaft 42 defines a groove 45 and is disposed annularly about the first biasing device 40 and the cylinder 37. This allows the locking rib 44 to slide into a groove 45.

Figure 1:
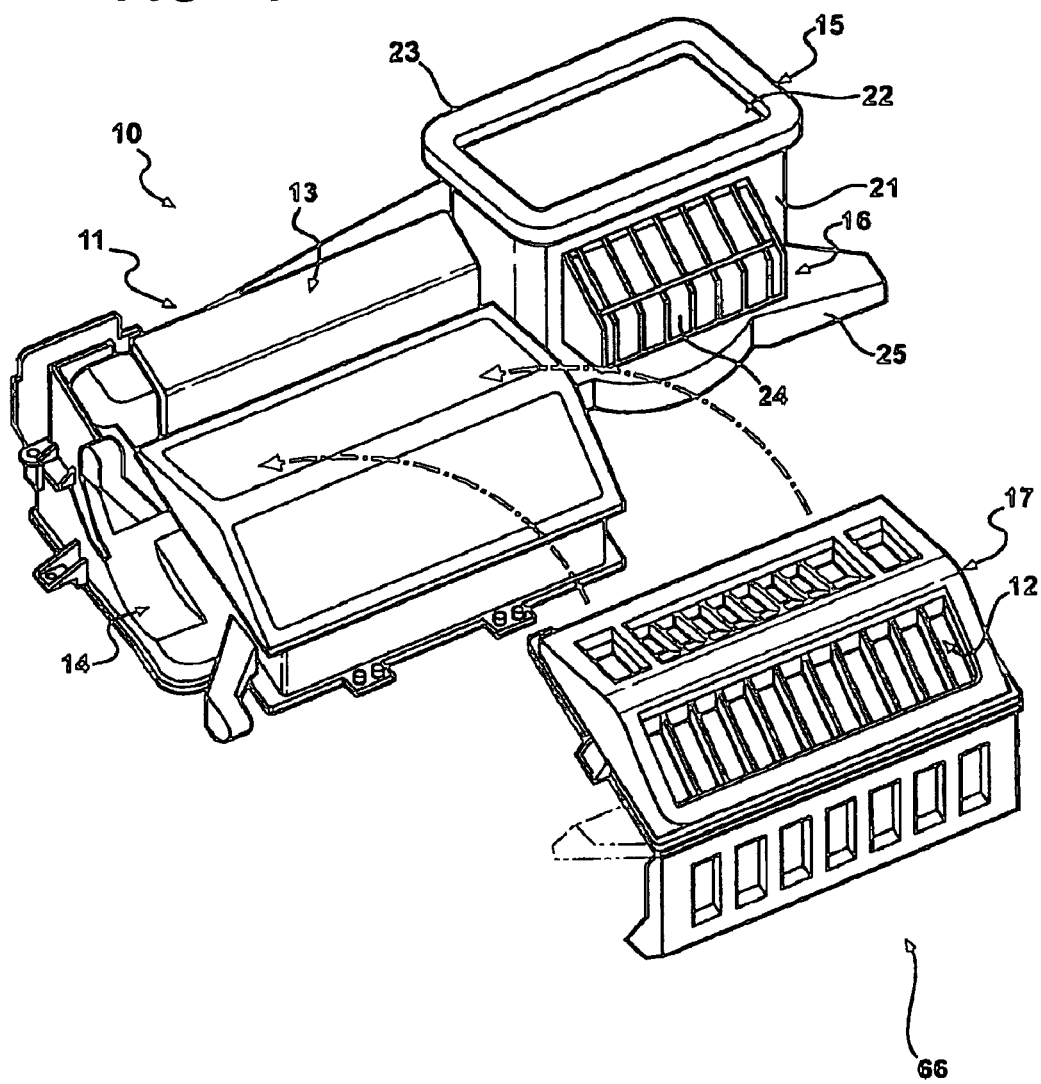
FIG. 1 is a perspective view of an HVAC system.

With particular reference to FIGS. 1 and 2, the film 63 of the HVAC system 10 according to a preferred embodiments of the present invention will now be described in greater detail. The film 63 includes a substrate 61. The film 63 is moveable over the frame 26 between open and closed positions for controlling the air flow through the housing 11.

Figure 9A:
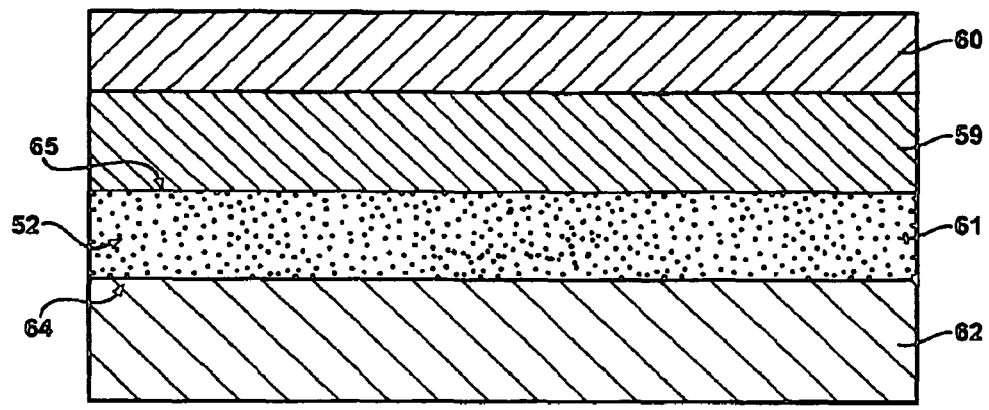
FIG. 9a is a cross-sectional view of the film in accordance with the subject invention.
Figure 9B:
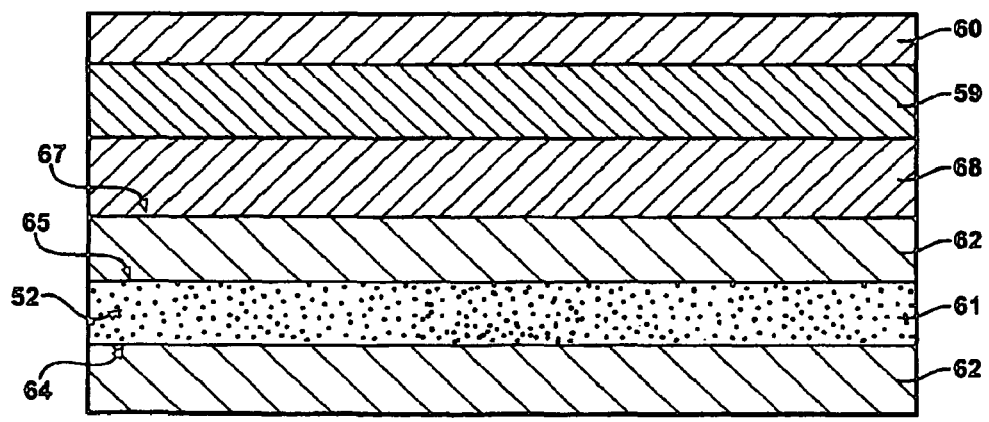
FIG. 9b is a cross-sectional view of the film including an optional binder layer.

With reference to FIGS. 9a, and 9b, the substrate 61 includes a fiber 52 selected from the group of polyester-based fibers, glass-based fibers, and combinations thereof. In a first preferred embodiment, in FIG. 9a, a fluoropolymer layer 62 is disposed on a first face 64 of the substrate 61 and may include, but is not limited to, a perfluoropolymer such as polytetrafluoroethylene. The fluoropolymer layer 62 also includes an additive to make the fluoropolymer layer 62 non-electrically charging. An elastomeric layer 59 is disposed on a second face 65 of the substrate 61. Finally, a topcoat layer 60 is disposed on the elastomeric layer 59. Preferably, the topcoat layer 60 has a thickness of from 0.2 to 0.7 mils, and more preferably has a thickness of from 0.3-0.5 mils. The topcoat layer 60 minimizes the noise created as the substrate of the film moves between the open and closed positions in the housing 11 of the HVAC system 10.

In a second preferred embodiment, in FIG. 9b, the fluoropolymer layer 62 is disposed on the first and second faces 64, 65 of the substrate 61 and may include, but is not limited to, a perfluoropolymer such as polytetrafluoroethylene. The fluoropolymer layer 62 also includes an additive to make the fluoropolymer layer 62 non-electrically charging. A mixture of a colloidal silica dispersion and a perfluorinated copolymer resin dispersion 68 is disposed on a face 67 of the fluoropolymer layer 62. An elastomeric layer 59 is disposed on the mixture of the colloidal silica dispersion and the perfluorinated copolymer resin dispersion 68. Finally, a topcoat layer 60 is disposed on the elastomeric layer 59. The topcoat layer 60 minimizes the noise created as the substrate of the film moves between the open and closed positions in the housing 11 of the HVAC system 10.

More specifically, in the preferred embodiment, the substrate 61 includes, but is not limited to, an industry standard 1080 style fiberglass. In an alternative embodiment, the substrate 61 includes, but is not limited to, a polyester woven fabric created from yarns between 40 and 200 denier. Specifically, nylon-based fibers are not included in the substrate due to the nylon-fibers' ability to absorb water and freeze.

Additionally, in the preferred embodiment, the additive includes carbon black, graphite, metallic powder, metallic flakes, and metallic fibers.

In particular embodiments, the elastomeric layer 59 dampens noise and improves the seal between the film 63 and the HVAC housing 11. Generally, the elastomeric layer 59 is a flexible material, which may be formed of elastomers formed from any one of chloroprene (CR), ethylene-propylene-diene (EPDM), ethylene-propylene (EPM), nitrile-butadiene (NBR), silicones (Si), styrene-butadiene (SBR), isobutene-isoprene (IIR), isoprene, chloro-sulfonyl-polyethylene (CSM), acrylate-butadiene (ABR), ethylene acrylics, epichlorohydrin, polyacrylates (ACM), polyurethanes (AU, EU), poly(oxy-1,4, butylene)ether (EU-polyether urethane), chlorinated-polyethylene (CM), chlorosulfonated polyethylene (CSM), hexafluoropropylene-vinylidene fluoride (FPM), polybutadiene (BR), butyl rubber, tetrafluoroethylene-fluoronitrosomethane-perfluorobutyric acid (AFMU), polysulfides (T), polychloromethyl oxirane (CO), ethylene oxide and chloromethyl oxirane (ECO), polyphosphazene fluoroelastomer (FZ), fluoroelastomers (FKM), and fluorosilicones (FSi), and combinations thereof.

In one exemplary embodiment, the elastomeric layer 59 includes a silicone rubber. More specifically, the silicone rubber is a platinum catalyzed, solventless, addition-cure, 100 percent solids, liquid silicone rubber composition. The liquid silicone rubber is composed of commercially available A and B components that are mixed in a specified ratio, typically 1:1 or 10:1. Each component includes vinyl-terminated polydimethylsiloxane polymers and may include fumed silica as a reinforcing filler, and/or extending fillers. Typically, the A component includes a catalyst and the B component includes a cross-linking agent and an inhibitor. The inhibitor is removed upon application of heat to the liquid silicone rubber, thus effecting a cure.

As the A component, the elastomeric layer 59 may incorporate an organic peroxide catalyst. The organic peroxide catalyst may be applied from a solvent solution, dried if necessary to remove the solvent solution and heated appropriately to effect a cure. Conversely, the elastomeric layer 59 may incorporate an atmospheric-moisture-activated acetoxy cure system. The acetoxy cure system may be dried if necessary to remove the solvent solution and allowed to remain exposed to moist air sufficiently long to effect a cure.

In another alternative embodiment, the elastomeric layer 59 may include a urethane, instead of the silicone rubber.

In particular embodiments, fluoroelastomers, fluorosilicones, silicones, or other materials with heat-resistant characteristics may be particularly useful in applications where fire-resistance or exposure to high temperatures is desired. Other desirable features might include oil resistance, permeability to various gases, or other application dependent properties.

In one embodiment, the elastomeric layer 59 has a hardness of 0 to 60 on the Shore A hardness scale. For example, the hardness may be 10 to 50 Shore A hardness, or 10 to 30 Shore A hardness. Often, hardness of a material is influenced, for example, by cross link density and filler loading. To soften materials, cross-link density is typically reduced and to harden materials, cross-link density is typically increased. Cross-link density can be increased by incorporation of multifunctional monomers, exposure to radiation (including UV, electron-beam, and others), incorporation of free-radical initiators, combinations thereof and other methods known in the art. Cross-link density, and thus hardness, can be reduced, for example, by incorporating reactive diluents, plasticizers, blowing agents, or other additives.

Fillers can be used to modify hardness. Inorganic fillers, such as silica, alumina, talc, calcium carbonate, clay, and numerous others can be incorporated to increase the hardness of elastomeric material. Organic fillers such as wax, PTFE, polyethylene, polypropylene, polyvinylchloride, polystyrene, ABS, acrylics, polyesters, polyamids, polycarbonates, acetals, phenolics, melamines, and epoxies, among others, can be incorporated to either increase or decrease the bulk hardness of a material. In addition, additives may be incorporated into one or more of the fluoropolymer layers 62, elastomeric layers 59, and topcoat layers 60.

An example of the colloidal silica dispersion includes, but is not limited to, Ludox® 40, manufactured by DuPont of Wilmington, Del. Additionally, examples of the perfluorinated copolymer resin dispersion include, but are not limited to, fluorinated ethylene propylene or perfluoroalkoxy-modified tetrafluoroethylene.

Finally, in the preferred embodiment, the topcoat layer 60 is formed from a silicone containing composition including a vinyl and methoxy function dimethyl siloxane. An example of a silicone containing composition including a vinyl and methoxy function dimethyl siloxane includes, but is not limited to, 3715 manufactured by Dow Corning Inc. of Midland, Mich. Alternatively, the topcoat layer 60 may be formed of hardened elastomers, such as the elastomers described above.

In general, the topcoat layer 60 has substantially different properties than the elastomeric layer 59. In one particular embodiment, the topcoat layer 60 reduces noise associated with blocking, tack, or sticking to surfaces along which the topcoat layer 60 moves as the film moves between the open and closed positions in the housing 11 of the HVAC system. Blocking generally refers to sticking of adjacent surfaces of the same material. In addition, the topcoat has a low coefficient of friction to facilitate movement of the film. For example, in automotive film valve applications, the static and dynamic coefficients of friction of the topcoat layer 60 are generally not greater than about 0.5, such as not greater than about 0.3, as measured against a smooth polypropylene surface.

In particular, a topcoat layer 60 formed of material with a hardness of at least about 90 as measured on a Shore A scale, or at least about 20, as measured on a Shore D scale, achieves the desired non-tack and friction properties. For example, the topcoat layer 60 may have hardness at least about 95, such as at least about 100 on the Shore A scale. In general, the topcoat layer 60 is relatively harder than the elastomeric layer 59. As mentioned above, hardness may be modified by, for example, modification of cross-link density and incorporation of fillers. In particular embodiments, it is found that a topcoat layer 60 including an elastomer of relatively low hardness (Shore A 60 or less) highly filled with a "hard" filler (40% talc or more, by weight) achieves a hardness greater than Shore A 90 after curing and has a resulting coefficient of friction less than about 0.3 and low tack. Alternatively, the film may include an elastomeric layer 59 formed of a polymer that meets the desired characteristics without additional modification (e.g., PTFE, with a Shore D hardness of approximately 50 and a coefficient of friction below 0.3) bonded to a topcoat layer 60 formed of a polymer having sufficient crosslink density to achieve the desired hardness.

In particular embodiments, a topcoat layer thickness of 0.2-0.7 mils with an elastomeric layer thickness of 2-4 mils provides a film with the desired properties. For example, a ratio of topcoat thickness to elastomeric thickness may be about 1:2 to 1:15, and more preferably about 1:3 to 1:10. In alternative embodiments, a second topcoat layer may overlie the substrate and intermediate layers (if any) on a side opposite topcoat layer 60.

To synthesize the film 63, according to FIG. 9b, a multi-step method is used. In a first step, the substrate 61 is paid off a roll and coated on the first 64 and second side 65 with a fluoropolymer. The first 64 and second 65 sides are dipped in a 100 percent solid system of the fluoropolymer to form the fluoropolymer layer 62. The fluoropolymer layer 62 is then wiped and heated sufficiently to sinter or fuse the fluoropolymer. Typically, the first step is repeated several times in order to apply a desired amount of fluoropolymer to the substrate 61 that is free of cracks and other defects. Alternately, the fluoropolymer layer 62 can be smoothed and consolidated by passing the substrate 61 through a calendar machine (not shown).

Ideally, the fluoropolymer layer 62 should be as thin as possible, while sufficient to achieve the desired function. Although a variety of thicknesses of the fluoropolymer layer 62 can be utilized, a thickness from 1-5 mils is preferred.

In a second step, the side 67 of the fluoropolymer layer is rendered bondable by coating with a mixture of a colloidal silica dispersion and a perfluorinated copolymer resin dispersion 68.

Alternately, the side 67 of the fluoropolymer layer may be rendered bondable by treatment with a mixture of sodium metal, naphthalene, and a glycol ether, or alternately, a mixture of sodium metal and anhydrous ammonia. If applicable, other means for rendering the side 67 of the fluoropolymer layer bondable include, but are not limited to, corona treatment in special atmospheres, chemical and electrochemical treatments, metal sputtering, and vacuum deposition of metals or metal oxides.

In a third step, a controlled amount of an elastomeric material is applied to the side 67 of the fluoropolymer layer. The elastomeric layer 59 should be as thin as possible, while sufficient to achieve the desired function. Although a variety of thicknesses of the elastomeric layer 59 can be utilized, a thickness from 2-50 mils is preferred.

In a final step, the elastomeric layer 59 is dipped in a silicone topcoat solution to form the silicone topcoat layer 60. After dipping, the silicone topcoat layer 60 is wiped to remove excess solution and heated sufficiently to cure. Upon curing, the silicone topcoat layer 60 and the subject invention, is complete.

In a further alternative embodiment of the subject invention, the control surfaces 58a, 58b can also be defined as air dampers (not shown) within the HVAC system 10. Air dampers may include one or more flow control vanes or blades which are moveable between a fully open position and a fully closed position by a drivetrain including a gearshaft.

Optionally, an actuator may be used to electrically control the air damper from a distant location if desired and continuously adjust the closure position in response to an input. Further, the air damper may be oriented in any position as dictated by the particular application The foregoing detailed description shows the preferred embodiments of the present invention are well suited to fulfill the objectives of the invention. It is recognized that those skilled in the art may make various modifications or additions to the preferred embodiments chosen herein to illustrate the present invention, without departing from the spirit of the present invention. It should also be recognized that any feature of the invention can be used in combination with any other feature of the invention. Accordingly, it is to be understood that the subject matter sought to be afforded protection should be deemed to extend to the subject matter defined in the appended claims, including all equivalents thereof.

What is claimed is:

1. A multilayer film comprising:
a substrate having first and second major surfaces;
a first polymer layer overlying the first major surface of the substrate and comprising an elastomer, wherein the elastomer is selected from the group consisting of urethane and silicone rubber;
a second polymer layer overlying the first polymer layer and formed from a cured-in-place silicone polymer; and
a third polymer layer overlying the second major surface of the substrate, the third polymer layer comprising fluoropolymer,
wherein the second polymer layer has a thickness of 0.2 mils to 0.7 mils.

2. The multilayer film of claim 1, wherein the cured-in-place silicone polymer comprises vinyl and methoxy function dimethyl siloxane.

3. The multilayer film of claim 1, wherein the first polymer layer has a Shore A hardness of 10 to 50.

4. The multilayer film of claim 1, wherein the second polymer layer has a Shore A hardness at least about 90.

5. The multilayer film of claim 1, wherein the fluoropolymer comprises perfluoropolymer.

6. The multilayer film of claim 1, wherein the first layer is non-electrically charging.

7. The multilayer film of claim 1, wherein the second layer is non-electrically charging.

8. The multilayer film of claim 1, wherein the elastomer is silicone rubber.

9. The multilayer film of claim 1, wherein the elastomer is urethane.

10. The multilayer film of claim 1, further comprising a fourth polymer layer disposed between the substrate and the first polymer layer, the fourth polymer layer comprising fluoropolymer.

11. The multilayer film of claim 10, further comprising a fifth polymer layer disposed between the fourth polymer layer and the first polymer layer, the fifth polymer layer comprising fluoropolymer and colloidal silica and in contact with the first polymer layer.

12. The multilayer film of claim 1, wherein the substrate includes fibers.

13. The multilayer film of claim 12, wherein the substrate is woven fabric.

14. A multilayer film comprising:
a substrate having first and second major surfaces;
a first polymer layer overlying the first major surface of the substrate and comprising an elastomer, wherein the elastomer is selected from the group consisting of urethane and silicone rubber;
a second polymer layer overlying the first polymer layer and in contact with and bonded to the first polymer layer, the second polymer layer comprising a cured silicone polymer, the second polymer layer having a thickness of 0.2 mils to 0.7 mils; and
a third polymer layer disposed between the first major surface and the first polymer layer and in contact with the first polymer layer, the third polymer layer comprising fluoropolymer and colloidal silica.

15. The multilayer film of claim 14, further comprising a fourth polymer layer disposed between the first major surface and the third polymer layer, the fourth polymer layer comprising fluoropolymer.

16. The multilayer film of claim 14, wherein the elastomer is urethane.

17. The multilayer film of claim 14, wherein the elastomer is silicone rubber.

18. The multilayer film of claim 1, wherein the second polymer layer minimizes noise created as the film moves.

19. The multilayer film of claim 1, wherein the substrate includes a fiber selected from the group consisting of polyester-based fibers, glass-based fibers, and combinations thereof.

20. The multilayer film of claim 1, wherein the multilayer film includes an opening.

21. The multilayer film of claim 14, wherein the cured silicone polymer comprises vinyl and methoxy function dimethyl siloxane.

22. A multilayer film comprising:
a substrate having first and second major surfaces;
a first polymer layer overlying the first major surface of the substrate and comprising an elastomer, wherein the elastomer is silicone rubber;
a second polymer layer overlying the first polymer layer and in contact with and bonded to the first polymer layer, the second polymer layer comprising a cured silicone polymer comprising vinyl and methoxy function dimethyl siloxane, the second polymer layer having a thickness of 0.2 mils to 0.7 mils; and
a third polymer layer disposed between the first major surface and the first polymer layer and in contact with the first polymer layer, the third polymer layer comprising fluoropolymer and colloidal silica.

* * * * *